3,646,210
FUNGICIDAL AND BACTERICIDAL COMPOSITION AND METHOD CONTAINING 3-THIOCYANOINDOLE DERIVATIVES

Stig Hjalmar Johannes Akerstrom, Konvaljegrand 3A, 75251 Uppsala, Sweden; Albert Tempel, Van Houtenlaan, Netherlands; and Bengt Hjalmar Gullfeldt, Selangergrand 3, 16229 Vallingby, Sweden
No Drawing. Original application Jan. 3, 1968, Ser. No. 695,352, now Patent No. 3,546,244, dated Dec. 8, 1970. Divided and this application June 8, 1970, Ser. No. 44,602
Claims priority, application Sweden Jan. 4, 1967, 193/67; June 2, 1967, 7,722/67
Int. Cl. A01n 9/22
U.S. Cl. 424—274                                   4 Claims

ABSTRACT OF THE DISCLOSURE 3-thiocyanoindoles found to be useful fungicides and bactericides.

---

This application is a division of our copending application Ser. No. 695,352, filed Jan. 3, 1968, now U.S. Pat. No. 3,546,244.

The present invention relates to compounds represented by the general Formula I

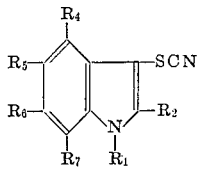

in which formula $R_1$ stands for a hydrogen atom or any one of the radicals alkyl, aryl, aralkyl and acyl $R_2$ stands for a hydrogen atom or any one of the radicals alkyl, alkoxy, alkylthio, aralkyl, aryl, carboxyl and trifluoromethyl, $R_4$–$R_7$ may be the same or different and represent a hydrogen- or halogenatom or any one of the radicals alkyl, acyloxy, alkoxy, alkylthio, hydroxy, cyanogen, thiocyanogen, nitro and nitro-fluoromethyl.

Applicant has found the compounds of the general Formula I influence the growth of microbiological organisms. In particular it has been found that the compounds are suitable to be used in compositions for the control of plant pathogenical micro-organisms which occur as pests in both forests and on agricultural plants.

The compounds of the invention have also proved to be extremely useful in compositions for the control of certain fungi and baceteria which cause trouble in connection with the preservation of particularly forestry products such as wood, pulp and paper, but also paints.

Furthermore it was found that the compounds of the invention can advantageously be used in compositions for control of the formation of slime, e.g. in the forest industry.

As a rule, in all of the above-mentioned cases, pesticides containing mercury or other extremely toxic pesticides have hitherto been used. Because of their toxicity, these compositions of course have involved considerable drawbacks, which have been further accentuated owing to the fact that they are accumulated in living organisms. Further, the toxicity has rendered it inappropriate to use the compositions as, for instance, wrappings for foodstuffs and in paint for indoor use. These previously used toxic compositions also have the drawback that they have a tendency to give rise to resistant species of microorganisms.

As a result of the present invention a new composition for the control of microbiological organisms has become available which is characterized by a content of at least one of the compounds of the general Formula I. Said composition can be prepared in the usual way by mixing the active compound with a solid or liquid inert diluent if desirable together with surface-active agents, such as emulsifiers and wetting agents, and/or dispersing agents. The compositions according to the invention possess an essential lower degree of toxicity than the known compositions containing mercury and do not show the drawback mentioned above.

Thus, tests have shown that the risks for resistant species of micro-organisms arising is essentially lower for compositions according to the present invention than for the compositions containing mercury which have previously been used. The composition created according to the present invention has proved to have at least as wide a spectrum, in regard to both fungi and bacteria, as the previously used compositions containing mercury, and it has also proved that they can often be used in lower concentrations.

When in the formula represented herebefore the symbol $R_1$ represents an alkyl group, then preferably such a group contains from 1–10 carbon atoms, so as for example a methyl-, propyl-, or heptyl group.

When $R_1$ or $R_2$ represents an aryl or aralkyl group, such a group comprises from 6–20 carbon atoms so as for example a phenyl group, naphthyl group, benzyl group or trityl group.

When $R_1$ represents an acyl group, this group preferably contains from 2–12 carbon atoms, for example a benzoyl group, naphtoyl group, or acetyl group.

When $R_1$ represents an acyl group, this group preferably contains from 2–12 carbon atoms, for example a benzoyl group, naphtoyl group, or acetyl group.

When $R_2$, $R_4$, $R_5$, $R_6$ or $R_7$ represents an alkyl, alkylthio or alkoxy group, such a group generally comprises from 1–7 carbon atoms, for example, a methyl-, ethyl-, heptyl-, methoxy-, ethoxy-, methylthio-, or ethylthio-group.

When $R_4$, $R_5$, $R_6$ or $R_7$ represents an acyloxy group such a group contains preferably from 6–12 carbon atoms such as a phenoxy or naphthoxy group.

The compounds of the invention are new with the exception of 3-thiocyanoindole and can be prepared according to methods known for the preparation of such compounds or, according to methods analogous thereto.

Thus the inventive compounds may be prepared.

(a) By reaction of a compound of the formula

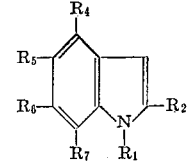

in which formula $R_1$ stands for a hydrogen atom or anyone of the radicals alkyl, aryl, aralkyl and acyl, $R_2$ stands for a hydrogen atom or anyone of the radicals alkyl, alkoxy, alkylthio, aralkyl, aryl, carboxyl and trifluoromethyl, $R_4$–$R_7$ may be the same or different and represent a hydrogen- or halogenatom or anyone of the radicals alkyl, acyloxy, alkoxy, alkylthio, hydroxy, cyanogen, nitro and nitro-fluoromethyl.

with an alkalimetal thiocyanate in the presence of a halogen, preferably bromine, and an alcohol, preferably methanol, to introduce a thiocyano-group at position 3.

(b) By reaction of a compound of the formula

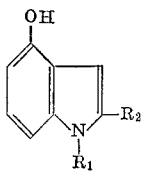

in which formula

R₁ stands for a hydrogen atom or anyone of the radicals alkyl, aryl, aralkyl and acyl, R₂ stands for a hydrogen atom or anyone of the radicals alkyl, alkoxy, alkylthio, aralkyl, aryl, carboxyl and trifluoromethyl.

with an alkalimetalthiocyanate in the presence of a halogen, preferably bromine and an alcohol, preferably methanol, whereby a compound of the formula

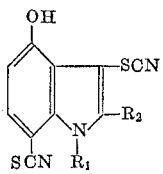

wherein $R_1$ and $R_2$ have the meanings as given above, is produced.

(c) By reaction of a compound of the formula

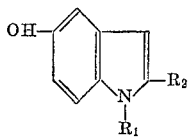

in which formula

R₁ stands for a hydrogen atom or anyone of the radicals alkyl, aryl, aralkyl and acyl, R₂ stands for a hydrogen atom or anyone of the radicals alkyl, alkoxy, alkylthio, aralkyl, aryl, carboxyl and trifluoromethyl, with an alkalimetal thiocyanate in the presence of a halogen, preferably bromine, and an alcohol, preferably methanol, whereby a compound of the formula

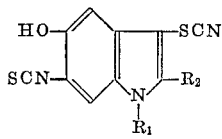

wherein $R_1$ and $R_2$ have the meanings as given above, is produced.

(d) By reaction of a compound of the formula

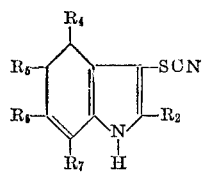

in which formula

R₂ stands for a hydrogen atom or anyone of the radicals alkyl, alkoxy, alkylthio, aralkyl, aryl, carboxyl and trifluoromethyl, R₄–R₇ may be the same or different and represent a hydrogen- or halogenatom or anyone of the radicals alkyl, acyloxy, alkoxy, alkylthio, hydroxy, cyanogen, thiocyanogen, nitro and nitro fluoromethyl with an acylhalide or an acid anhydride preferably in the presence of an acid binder, to introduce an acylgroup at position 1 of the indole nucleus. The preparation of the inventive compounds may be illustrated by the following preparation examples.

EXAMPLE 1

1-methyl-3-thiocyanoindole 60 g. of potassium thiocyanate and 150 ml. of methanol was charged in a 500 ml. flask, and cooled with Dry-Ice acetone, while stirring, to 155 to —60° C., after which a cooled solution of 13.5 g. of bromine in 150 ml. of methanol was dripped in during a time of 40 minutes at —55° C. In the same way, a solution of 30 g. of 1-methylindole in 125 ml. of methanol was added. After stirring for a further 4 hours, at which the temperature was allowed to rise to —20° C., the mixture was poured out on 400 g. of ice plus water. As soon as the ice had melted, the precipitation was filtered off, washed with water, dried and re-crystallized from benzene-ligroin. Melting point 87–89° C.

$C_{10}H_8N_2S$: S calculated 17.0%; S found 16.9%.

EXAMPLE 2

1-acetyl-3-thiocyanoindole 10 g. of 3-thiocyanoindole and 125 ml. of acetic anhydride was charged into a 250 ml. flask which was provided with stirrer and refluxer. After heating with refluxing for 9 hours, followed by cooling to room temperature. The flask was placed in a refrigerator for crystallization. The crystals were filtered off and re-crystallized from benzene-ligroin. Melting point 115–120° C.

$C_{11}H_8N_2OS$: S calculated 14.8%; S found 14.2%.

EXAMPLE 3

2-methyl-3-thiocyanoindole

The synthesis was carried out as per Example 1, with the following chemicals:

4 g. of potassium thiocyanate in 25 ml. of methanol
1 ml. of bromine in 25 ml. of methanol
2 g. of 2-methylindole in 25 ml. of methanol The product was re-crystallized from benzene-ligroin. Melting point 107–108° C.

$C_{10}H_8N_2S$: S calculated 17.0%; S found 17.2%.

EXAMPLE 4

4-methyl-3-thiocyanoindole

The synthesis was carried out as per Example 1, with the following chemicals:

10 g. of potassium thiocyanate in 50 ml. of methanol
2.5 ml. of bromine in 50 ml. of methanol
5 g. of 4-methylindole in 50 ml. of methanol The product was re-crystallized from methanol-water. Melting point 125–126.5° C.

$C_{10}H_8N_2S$: S calculated 17.0%; S found 17.6%.

EXAMPLE 5

6-methoxy-3-thiocyanoindole

The synthesis was carried out as per Example 1, with the following chemicals:

7.5 g. of potassium thiocyanate in 50 ml. of methanol
1.9 ml. of bromine in 50 ml. of methanol
5 g. of 6-methoxyindole in 50 ml. of methanol The product was re-crystallized from benzene-ligroin. Melting point 1.08–112° C.

$C_{10}H_8N_2OS$: S calculated 15.7%; S found 15.3%.

EXAMPLE 6

7-chloro-3-thiocyanoindole

The synthesis was carried out as per Example 1, with the following chemicals:

8.8 g. of potassium thiocyanate in 50 ml. of methanol
2.2 ml. of bromine in 50 ml. of methanol
5 g. of 7-chloroindole in 50 ml. of methanol The product was re-crystallized from benzene-ligroin. Melting point 135–137 C.

$C_9H_5ClN_2S$: S calculated 15.3%; S found 15.1%.

EXAMPLE 7

6-cyano-3-thiocyanoindole

The synthesis was carried out as per Example 1, with the following chemicals:

9.4 g. of potassium thiocyanate in 50 ml. of methanol
2.4 ml. of bromine in 50 ml. of methanol
5 g. of 6-cyanoindole in 50 ml. of methanol The product was re-crystallized from methanol-water. Melting point 173.5–175° C.

$C_{10}H_5N_3S$: S calculated 16.1%; S found 15.8%.

As interesting compounds of the underlying invention can be mentioned by way of example:

1-methyl-3-thiocyanoindole
1-butyl-3-thiocyanoindole
1-heptyl-3-thiocyanoindole
1-acetyl-3-thiocyanoindole
2-methyl-3-thiocyanoindole
2-phenyl-3-thiocyanoindole
4-methyl-3-thiocyanoindole
6-methyl-3-thiocyanoindole
6-methoxy-3-thiocyanoindole
4-chloro-3-thiocyanoindole
6-chloro-3-thiocyanoindole
7-chloro-3-thiocyanoindole
6-cyano-3-thiocyanoindole
4-hydroxy-3,7-dithiocyanoindole
5-hydroxy-3,6-dithiocyanoindole
3-thiocyanogen-4-chloroindole-2-carboxylic acid
3-thiocyanogen-6-bromoindole-2-carboxylic acid
3-thiocyanoindole Among the micro-organisms that have been tested and against which the preparations according to the present invention have proved to produce good effects can be mentioned: *Rhizina inflata, Fomes annosus, Crumenula abietina, Fusarium culmorum, Fusarium avenacium, Botrytix cinerea, Trichoderma viride, Herpotrichia nigro, Polyporus abientinus, Stereum sanguinolent, Lanzites sepiaria, Scopularia phycomyces, Pullularia pullulans, Coniophora puteana, Merulius lacrymans, Lentinus lepideus, Poria vaporaria, Polyporus versicolor, Ceratocystio pilofora, Aerobacter aerogenes, Pseudomones flourescens, Bacillus subtilis, Micrococcus aureus. Escherichia coli, Candida albicans, Aspergillus niger.*

The toxicity of the composition has been tested, and then applied perorally on rats, and it has then been found that the value for a lethal dose with 50% lethality (LD 50) is 160±60 mg./kg. This value can be regarded as entirely safe when using the quantities (100–1000 p.p.m.; p.p.m.=parts per million) used in the present case.

A test series was carried out with compositions according to the present invention for the purpose of controlling certain fungi proved to involve considerable difficulties when cultivating pine and fir plants, particularly in forest nurseries. The problem of protecting pine and fir plants in forest nurseries is very great, among other things, owing to the fact that the material is comparatively expensive, as it often takes a rather long time to obtain suitable specimens of plants. The problem has become still more complicated in as much as plastic greenhouses are now used to a great extent when raising fir and pine plants and, consequently the fungi that cause damages have better possibilities of developing than previously. The fungi which primarily come into question and with which tests have been made are as follows: *Rhizina inflata, Fomes annosus, Crumenula abietina, Fusarium culmorum, Fusarium avenacium, Botrytis cinerea, Trichoderma viride* and *Herpotrichia nigro.* Previously, no entirely satisfactory preparation has been found for the control of these fungi, but compositions used are those containing zinc carbamate, 1-phenylthiosemicarbamide and dichlorotetrafluoroacetone and at the trials made, the results obtained with the compositions according to the present invention were compared just with those obtained with the known compositions mentioned above.

It was found that the compositions according to the invention so as for instance compositions containing 3-thiocyano-indole, N-heptyl-thiocyanoindole or N-methyl-thiocyanoindole gave an very good pesticidal effect and this effect was considerably higher than what had been obtained with the known compositions.

In another test series, three plant pathogenical fungi were tested, viz. *Fomes annosus, Trichoderma viride* and *Rhizina inflata.* This series was carried out in such a way that the fungi were cultivated in an entirely conventional way in Petri dishes on malt agar. After 10 days of cultivation at +24° C., the growth of fungi was measured, and indicated as the colony diameter.

In this test series, in addition to 3-thiocyanoindole, also a methoxy mercury composition was tested, which has previously been widely used in this connection, as well as tetramethyl thiuramdisulfide (TMTD) and, finally, a composition free from mercury which has been introduced in the market quite recently, of a furyl benzimidazole type. All the tests were carried out with two different concentrations of the active ingredient that is with a concentration of 1000 p.p.m. and with a concentration of 100 p.p.m.

From the test results it became clear that, as regards plant pathogenical fungi of the type tested, the compositions according to the present invention have proved to have a considerably better effect than the other compositions tested.

In a third test series, certain fungi were tested which cause damages on wet mechanical wood-pulp, and therefore constitute a problem at the preservation of this product. The fungi in question were: *Polyporus abientinus, Stereum sanguinolent, Fomes annosus* and *Lanzites sepiaria.* The tests were carried out in the same way as at the foregoing test series, by cultivating the fungi.

From the obtained results can be derived that as regards the 4 fungi which are of particular importance at the preservation of mechanical wood-pulp, the compositions according to the present invention give a considerably better effect than the known compositions.

A number of fungi that cause damages on lumber were tested in a fourth test series. The fungi in question were: *Scopularia phycomyces, Pullularia pullulans, Coniophora puteana, Merulius lacrymans, Lentinus lepideus, Poria vaporaria, Polyporus versicolor, Geratocystio philifora,* The tests were carried out in the same way as at the last of the foregoing test series, and the same compositions were used. It can be established from the test results that also as regards these 8 fungi, which cause much trouble at the preservation of lumber, the composition according to the present invention had an effect which is considerably superior to that of the other three compositions tested.

The two fungi *Trichoderma viride* and *Pullularia pullulans* already mentioned herebefore often cause trouble in the form of the formation of slime and discolouration within the paper industry and can be combatted effectively by the compositions of the invention as has been described hereabove.

The formation of slime within the pulp industry can also be caused by certain bacteria, and three of these are: *Aerobacter aerogenes, Pseudomones flourescens* and *Bacillus subtilis.* These have been tested in a special test series, in which 3-thiocyanoindole was applied to said bacteria. It has been found that the composition according to the present invention, in moderate concentrations (400 p.p.m.) gives entirely satisfactory results.

In an entirely conventional micro-biological test series, the minimum inhibiting concentration (MIC) in p.p.m. was determined for 4 different test organisms, viz. *Micro-* coccus aureus, *Escherichia coli, Candida albicans* and *Aspergillus niger.* At this test, a number of different substances according to the present invention were tested, for example 3-thiocyanoindole
1-butyl-3-thiocyanoindole
4-methyl-3-thiocyanoindole
6-cyano-3-thiocyanoindole
7-chloro-3-thiocyanoindole
4-hydroxy-3,7-dithiocyanoindole
5-hydroxy-3,6-dithiocyanoindole
6-methoxy-3-thiocyanoindole In most cases, entirely satisfactory inhibiting effects were obtained. The concentration used for the tests were 4, 8, 16, 40 and 200 p.p.m.

At the preservation of paints, it has proved that primarily the following organisms cause trouble: *Pseudomonas auriginosa, Flavobacterium marinum, Pullularia pullularis,* Cladosporium sp., Alternaria sp., *Phoma glomerata, Botrytis cinerea.* Previously, attempts have been made to control these organisms by adding copper, tin and mercury compounds, as well as chlorinated phenols in concentrations of between 0.05 and 2%. Owing to the high toxicity, however, none of these compounds have proved to be particularly suitable, and at all events it has not proved possible to use them to advantage for indoor painting. Tests made have shown that the growth of the micro-organisms in question is inhibited by the compositions according to the present invention, even if used in comparatively moderate concentrations (approx. 500 p.p.m.). Owing to the fact that the compositions according to the present invention only need to be added in such a small concentration, all risk for discolouration when using paint thus prepared is eliminated. Otherwise, such a discolouration has been a major problem at the preservation of paints. The inconvenience caused by the micro-organisms in paints is that they influence the shelf life of the paint, and that they affect the painted surfaces. The inconveniences have been particularly prounced in the case of emulsion paints, but through the use of the composition according to the present invention, satisfactory preservation of emulsion paints has also proved possible, without having to use compositions with a high degree of toxicity.

The compositions according to the present invention can be available in different forms including dry powders, wettable powders, emulsifying liquids, dispersions, emulsions, fumigating compounds and aerosols. These well-known formulations can be prepared in the usual way by mixing the active ingredient with a solid or liquid inert carrier if desired in combination with surface-active agents such as wetting-agents and emulsifiers, dispersing agents and adhesives.

The following examples show some different formulas of the composition according to the present invention.

EXAMPLE 1

Dry powder

In a ball mill or other mixing device, a mixture of 10 weight parts of 3-thiocyanoindole, 20 weight parts of talcum and 30 weight parts of plaster of Paris are mixed.

EXAMPLE 2

Dry powder

A thorough mix was prepared by mixing 5 parts of weight of 3-thiocyanoindole and 95 parts of weights of china clay, whereafter the mixture was ground in a mill.

EXAMPLE 3

Wettable powder 20 weight parts of 3-thiocyanoindole are fine-ground together with 40 weight parts of kaolin, 5 weight parts of lignin sulphamate and 3 weight parts of fat-alcohol sulphate.

EXAMPLE 4

Wettable powder 20 weight parts of 3-thiocyanoindole were mixed with 8 weight parts of Belloid TD (a dispersing agent consisting of a formaldehyde condensate and an alkylarylsulphonate) and 72 weight parts of china clay, whereafter the mixture was ground in a mill.

The wettable powder, thus obtained forms by dilution with water a stable watery dispersion of the active compound.

EXAMPLE 5

Wettable powder

Wettable powders were prepared by grinding the following mixture (parts of weight in a mill):

(a)

| | Percent |
|---|---|
| β-thiocyanindole | 50 |
| Belloid TD | 3 |
| Nansa S (a wetting agent consisting of the sodium salt of an alkylarylsulphone acid | 2 |
| China clay, ad 100%. | |

(b)

| | Percent |
|---|---|
| β-thiocyanindole | 50 |
| Tucen 60 (a dispersing agent in a polyoxyethylene derivation of sorbitanemonosteant) | 2 |
| Ethylon CP | ½ |
| China clay, ad 100%. | |

EXAMPLE 6

Emulsifying liquid

For the preparation of compositions suitable to be diluted with water in order to form a stable emulsion, the following components were mixed:

| | Percent |
|---|---|
| 3-thiocyanindole | 20 |
| Arylan CA (calciumdodecylbenzenesulphonate) | 5 |
| Ethylan BV (an octyl-phenylpolyethyleneoxide condensate) | 5 |
| Ethylacetate | 70 |

Similar compositions were prepared employing other active components, mentioned above, whereby the selection of said components had to be made with due consideration to their solubility in suitable solvents.

EXAMPLE 7

Emulsifying liquid

In room temperature or low heat, 10 weight parts of 3-thiocyanoindole, 50 weight parts of xylene, 10 weight parts of diethylene-glycol-diethyl ether and 8 weight parts of nonylphenol polyglycol ether, are mixed, giving a solution which can be emulsified in water.

We claim:

1. A fungicidal and bactericidal composition for the control of fungi and bacteria in products selected from the group consisting of wood, wood pulp, paper and paint comprising a fungicidally and bactericidally effective amount of a compound of the formula

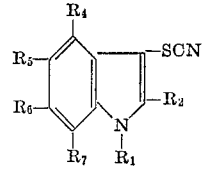

wherein $R_1$ is a member selected from the group consisting of hydrogen, alkyl of 1–10 carbon atoms, phenyl, naphthyl, benzyl and trityl, $R_2$ is a member selected from the group consisting of hydrogen, phenyl, naphthyl, benzyl, trityl, alkyl of 1–7 carbon atoms, alkylthio of 1–7 carbon atoms, alkoxy of 1–7 carbon atoms and trifluoromethyl, $R_4$, $R_5$, $R_6$ and $R_7$ are each members selected from the group consisting of hydrogen, halogen, hydroxy, cyano, thiocyano, nitro, nitrofluoromethyl, alkyl of 1–7 carbon atoms, alkoxy of 1–7 carbon atoms and alkylthio of 1–7 carbon atoms with the proviso that at least one of $R_2$, $R_4$, $R_5$ and $R_6$ is other than hydrogen and a finely divided inert carrier therefor.

2. A method of combatting the growth of undesirable fungi and bacteria in products selected from the group consisting of wood, wood pulp, paper and paint which method comprises treating the situs of said fungi and bacteria with a fungicidally and bactericidally effective amount of the composition of claim 1.

3. A method of combatting the growth of undesirable fungi and bacteria in products selected from the group consisting of wood, wood pulp, paper and paint which method comprises treating the situs of said fungi and bacteria with a fungicidally and bactericidally effective amount of 3-thiocyanoindole.

4. The method of claim 2 wherein the compound is 1-methyl-3-thiocyanoindole.

References Cited

UNITED STATES PATENTS 3,454,593  7/1969  Gal _____ 424—274 X

OTHER REFERENCES

Grant et al.: J. Am. Chem. Soc. 1960, vol. 82, pp. 2742–2744.

ALBERT T. MEYERS, Primary Examiner

D. R. ORE, Assistant Examiner

U.S. Cl. X.R.

106—15 AF; 424—168, 357